United States Patent [19]

Harris et al.

[11] Patent Number: 5,061,764
[45] Date of Patent: Oct. 29, 1991

[54] MOLDABLE AND/OR EXTRUDABLE POLY(ENAMINE KETONE-CO-ALKYLENE ETHER) BLOCK COMPOLYMERS

[75] Inventors: Frank W. Harris, Akron; David D. Russell, Ravenna, both of Ohio

[73] Assignee: University of Akron, Akron, Ohio

[21] Appl. No.: 368,802

[22] Filed: Jun. 20, 1989

[51] Int. Cl.$^5$ .............................. C08F 283/06
[52] U.S. Cl. .................................. 525/540; 525/471; 525/539; 528/229; 528/288
[58] Field of Search .................. 525/540, 408

[56] References Cited

U.S. PATENT DOCUMENTS 4,331,786  5/1982  Foy et al. ........................... 525/408
4,663,483  5/1987  Hergenrother et al. ............ 564/396

Primary Examiner—Melvyn I. Marquis
Assistant Examiner—D. E. Aylward
Attorney, Agent, or Firm—Oldham & Oldham Co.

[57] ABSTRACT

A moldable and/or extrudable poly(enamine ketone-co-alkylene ether) block copolymer is disclosed which has the formula shown below:

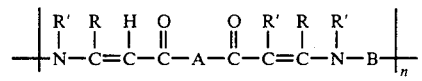

wherein R' is H or alkyl, alkoxyl, cycloalkyl, cycloalkoxyl and aryl and aryloxyl, A is a poly(enamine ketone) sequence and B is a polyalkylene ether sequence. The poly(enamine ketone-co-alkylene ether) block copolymer is preferably prepared under mild condition by reacting a bispropynone with an amine-terminated poly(alkylene ether); a bispropynone with an organic diamine and an amine-terminated poly(alkylene ether); or by reacting a preformed propynone-terminated poly(enamine ketone) with an amine-terminated poly(alkylene ether).

The compolymers have excellent mechanical properties, are moldable and extrudable and are useful for the manufacture of articles such as films, sheaths, fibers for textile products, and other moldable and/or extrudable articles and RIM shaping. These materials are also useful as bonded or welded linings and as hot-melt adhesives.

17 Claims, No Drawings

MOLDABLE AND/OR EXTRUDABLE POLY(ENAMINE KETONE-CO-ALKYLENE ETHER) BLOCK COMPOLYMERS

TECHNICAL FIELD

This invention describes a process of making moldable and/or extrudable poly(enamine ketone-co-alkylene ether) block copolymers.

More particularly, the instant invention relates to a moldable and/or extrudable poly(enamine ketone-co-alkylene ether) block copolymer having recurrent units of the formula (I)

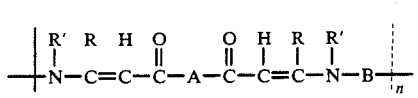

wherein R' is H, alkyl, aryl or cycloalkyl; A is a poly(enamine ketone) sequence and B is a polyalkylene ether sequence and methods for preparing same. This method, in one aspect condenses a bispropynone with an amine-terminated poly(alkylene ether) to yield novel moldable or shapable products. In another embodiment, this invention reacts with bispropynone, an organic diamine and an amine-terminated poly(alkylene ether) to get a novel shapable product. In a further embodiment of this invention, a preformed propynone-terminated poly(enamine ketone) reacts with an amine-terminated poly(alkylene ether). Thus, n above, indicates a sufficient number of repeating units have reacted so that said poly(enamine ketone-co-alkylene ether) block copolymer has an intrinsic viscosity of from about 0.2 to over 2 and preferably about 0.4 to about 2.0.

Herein when amine terminated polyalkylene ether or polyols is used it is for simplicity intended to indicate it is either di or poly amine terminated with the diamine terminated polyalkylene ethers being preferred.

BACKGROUND OF THE INVENTION

Homopolymers of polyenamine ketone have been previously synthesized. Hergenrother, et al disclosed in U.S. Pat. No. 4,663,483 the synthesis and characterization of several poly(enamine ketone)s. However, these polymers suffer from poor mechanical strength toughness and durability and were known class of thermoplastics. The polymers of Hergenrother et al. also require high temperatures and long reaction times to reach high polymer molecular weights and are not elastic. Further, these polymers are not generally stable above either their $T_g$ or $T_m$.

Thermoplastic elastomers made by condensation methods are widely known and widely used. However, no thermoplastic elastomers comprising the combination of the above two sequences have been reported.

As an example of the formation of moldable and/or extrudable thermoplastic elastomeric block copolymers, Foy et al discloses in U.S. Pat. No. 4,331,786 the formation of block copolymers consisting of polyamide sequences and polyoxyalkylene sequences with poly(alkenyl ether)s. These moldable and/or extrudable polymers are useful in a number of different areas because of their good mechanical properties. These useful areas of manufacturing include anti-static agents for textile fabrics.

Although poly(enamine ketone) homopolymers are deficient, thermoplastic elastomeric block copolymers made from hard blocks of poly(enamine ketone) sequences and soft blocks of poly(alkylene ether) sequences offer advantages relative to the homopolymers.

DISCLOSURE OF THE INVENTION

We have discovered that our new and novel thermoplastic elastomer block copolymers have excellent mechanical properties and thermal stability, especially at temperatures above either the polymers $T_g$ or $T_m$, because they are readily moldable and/or extrudable to allow them to find extrusion utility as films, sheaths, fibers for textile products, etc., or as material for making bonded or welded linings and as hot-melt adhesives.

The instant invention is aimed at introducing a new and novel poly(enamine ketone) polyether block copolymers having mechanical properties which allow these thermoplastic elastomer materials to be used in technological transformation operations for the manufacture of molded or extrudable articles such as films, sheaths, fibers for textile products, tubes, pipes, etc. These new block copolymers were discovered to overcome deficiencies in the homopolymers made from poly(enamine ketones).

Furthermore, it is an object of the present invention to provide a poly-condensation method for preparing poly(enamine ketone-co-alkylene ether) copolymers wherein the condensation reaction between the poly(enamine ketone) sequence and the polyoxyalklyene ether sequence is substantially complete and block copolymers are obtained which have sufficient molecular weight to establish a high intrinsic viscosity and to possess excellent mechanical properties viz. it may be used in a reaction injection molding (RIM) system.

It is a further object of this invention to provide a polycondensation method for the preparation of the polymers of formula (I), wherein A is an divalent aryl radical and B is an amine-terminated polyalkylene ether or mono alkylated amine-terminated polyalkylene ether sequence formed from linear or branched aliphatic polyoxyalkylene polyols having a molecular weight from about 300–15,000 with the preferred polyols having two hydroxyls or a glycol group.

It is a further object of this invention to provide a polycondensation method for the preparation of the polymers of formula (I), wherein A is an divalent aryl radical and B is an amine-terminated polyalkylene ether sequence formed from linear or branched aliphatic polyoxyalkylene glycols having a molecular weight from about 200–6000 and higher, and n indicates a sufficient number of repeating units so that said poly(enamine ketone co-alkylene ether) block copolymer has an intrinsic viscosity of preferably from about 0.4 to about 2.0 and resists decomposition at melt temperatures.

It is a further object of this invention to provide a polycondensation method for the preparation of the polymers of formula (I), wherein A is an divalent alkyl, aryl or cycloalkyl radical and B is an amine-terminated polyalkylene ether sequence formed from linear or branched aliphatic polyoxyalkylene polyols and preferably glycols having a molecular weight of between 300 and 15,000 and preferably about 800 to 5000.

It is a further object of this invention to provide a polycondensation method for the preparation of the polymers of formula (I), wherein A is an divalent alkyl radical and B is an amine-terminated polyalkylene ether sequence formed from linear or branched aliphatic polyoxyalkylene polyols or glycols having a molecular weight from about 200-6000 and up to 10,000-15,000 and higher, and n indicates a sufficient number of repeating units so that said poly(enamine ketone co-alkylene ether) block copolymer has an intrinsic viscosity of from about 0.2 and usually 0.4 to about 2.0 and higher.

It is a further object of this invention to provide a polycondensation method for the preparation of the polymers of formula (I), wherein A is a poly(enamine ketone) sequence formed preferably from an aliphatic or aromatic $C_6$-$C_{20}$, cycloalkyl, $C_6$-$C_{20}$ aryl, or cycloalkyl bispropynone and a linear or branched, aliphatic $C_6$-$C_{18}$ diamine where part of the amine hydrogens have been replaced with an organic radical in the presence of a chain-limiting aromatic or aliphatic bispropynone having 6 to 20 carbon atoms, said poly(enamine ketone) having an average molecular weight from about 300-15,000 and higher, and B is an amine-terminated polyalkylene ether sequence formed from linear or branched aliphatic polyoxyalkylene polyols (or glycols) having a molecular weight from about 300-15,000 and usually 1000 to 3000 and the polyoxyalkylene radical is poly(oxytetra methylene) when the better tensile properties are desired.

It is a further object of this invention to provide a polycondensation method for the preparation of the polymers of formula (I), wherein A is a poly(enamine ketone) sequence formed from an aliphatic or aromatic $C_6$-$C_{20}$ bispropynone and a linear or branched, aliphatic $C_6$-$C_{18}$ diamine, in the presence of a chain-limiting aromatic or aliphatic bispropynone having 6 to 20 carbon atoms, said poly(enamine ketone) having an average molecular weight from about 300-15,000 or higher, and B is an amine-terminated polyalkylene ether sequence formed from linear or branched aliphatic polyoxyalkylene glycols having a molecular weight from about 200-6000, and n indicates a sufficient number of repeating units so that said poly(enamine ketone co-alkylene ether) block copolymer has an intrinsic viscosity of from about 0.4 to about 2.0 and preferably to and higher.

It is still a further object of the present invention to provide a poly(enamine ketone-co-alkylene ether) block copolymer prepared by reacting an aromatic or aliphatic bispropynone with an amine-terminated poly-(alkylene ether), wherein the condensation reaction is carried out under mild conditions in the absence of solvents especially troublesome solvents such as m-creosol.

It is still a further object of the present invention to provide a poly(enamine ketone-co-alkylene ether) block copolymer prepared by reacting a bispropynone with preferably an aliphatic diamine and an amine-terminated poly(alkylene ether), wherein the condensation reaction is carried out under mild conditions in the absence of solvents or in the absence of troublesome solvents such as metacreosol. Thus, offering use in RIM process shaping system.

It is a further object of this invention to provide a route for the formation of the monomeric materials preforming the poly(enamine ketone) sequence of the above said block copolymers.

In order to accomplish the forgoing objectives, there are provided according to the present invention a moldable and/or extrudable poly(enamine ketone-co-alkylene ether) block copolymer of the formula (I) are prepared generally by the following reaction scheme:

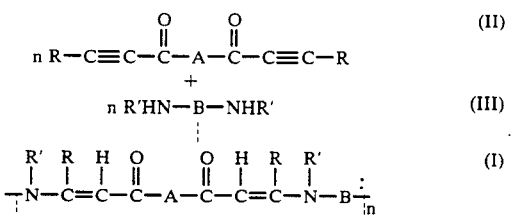

where R' is H, alkyl, aryl or cycloalkyl; A is a divalent aryl radical, a divalent alkyl radical, or a divalent cycloalkyl radical, or a poly(enamine ketone) sequence formed from an aliphatic or aromatic bispropynone i.e., bisacetylenic ketones and a linear or branched, aliphatic, cyclo-aliphatic or aromatic and mixtures thereof diamine, in the presence of a chain-limiting aromatic or aliphatic bispropynone and where -B is an amine-terminated polyalkylene ether, sequence preferably formed from linear or branched aliphatic polyoxyalkylene glycols, or a combination of an amine-terminated polyalkylene ether sequence formed from linear or branched aliphatic polyoxyalkylene glycols and a aliphatic diamine or aromatic diamine and where n is an integer of a magnitude to afford copolymers of formula (I) with sufficient molecular weight so that the copolymers have an intrinsic viscosity preferably of between 0.6 and 2.0 and where R is hydrogen, an alkyl radical, an aryl radical, a cyano radical, alkoxy, or halogen. Thus, a bispropynone (II) is reacted with an diamine (III) to give poly(enamine ketone-co-alkylene ether) block copolymers of sufficient molecular weight that the resulting polymers of formula I have viscosities between 0.4 and 2.0. Hence, by choosing the bisprpynones viz. II and the diamine III, the products of this invention can have soft blocks and hard blocks of varying properties depending on the nature of the bispropynones and the diamines. Thus, the product can be thermoplastic to thermoset in nature.

According to the present invention, there is further provided a process for preparing the poly(enamine ketone) sequences mentioned above by the following reaction scheme:

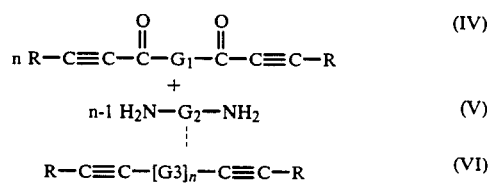

where R is as previously defined and $G_1$ is a divalent aliphatic or cycloaliphatic or aromatic radical and $G_2$ is an aliphatic or cycloaliphatio or aromatic diamine and $G_3$ represents an poly(enamine ketone) homopolymer and where n is sufficient to give bispropynone of formula (VI) of molecular weights from about 300-15,000 or higher. Thus, a bispropynone is reacted with a less than one to one amount of a diamine to yield a propynone terminated poly(enamine ketone) of formula (VI).

BEST MODE FOR CARRYING OUT THE INVENTION

Applicants have found that polycondensation of a bispropynone with an amine terminated polyoxyalkylene or with a diamine and an amine terminated polyoxyalkylene yields novel poly(enamine ketone-co-alkylene ether) thermoplastic elastomer block copolymers under mild conditions which are distinguished by high intrinsic viscosity, excellent mechanical properties, and wide temperature differences between $T_m$ and T to 5% weight loss (a measure of decomposition temperature), which can be shaped into useful articles.

There are several methods for preparing the poly(enamine ketone-co-alkylene ether) thermoplastic elastomer block copolymers of the present invention. A first procedure comprises reacting a bispropynone with a preformed amine terminated polyalkylene ether at moderate temperature and with sufficient amounts of each component to achieve a desire extent of polymerization sufficient to affirm a final polymer of acceptably high intrinsic viscosity.

A second procedure comprises reacting a bispropynone with a combination of a diamine and an amine terminated polyalkylene ether under similar conditions as above to produce a polymer of acceptably high intrinsic viscosity.

A third method comprises reacting a preformed poly(enamine ketone) with an amine terminated polyalkylene ether under similar condition as stated above. The preformed poly(enamine ketone)s are prepared by reacting a bispropynone with a diamine in the presence of a chainlimiting aromatic or aliphatic bispropynone. The preformed poly(enamine ketone)s can be prepared under known reaction condition. See for example U.S. Pat. No. 4,663,483. The amine terminated polyalkylene ether are known and are commercially available such as Polamine (Registered trade name) from Polaroid Commercial Chemicals, Polacure (Registered trade name) from Polaroid Commercial Chemicals, alpha, omega-bis(3-aminopropyl)poly(tetramethylene ether) from BASF, or Jeffamine (Registered trade name) from Texaco Chemical Company to name some of these well known ones. The bispropynones can be prepared by known chemical means and the diamines useful herein normally are used as curatives for polyurethane isocyanate prepolymers.

In particular, the preformed poly(enamine ketones) are prepared by reacting an aliphatic, cycloaliphatic or aromatic $C_6$–$C_{20}$ bispropynone with a linear or branched $C_6$–$C_{18}$ diamine in the presence of a chain limiting aromatic or aliphatic bispropynone having 6 to 20 carbon atoms, said poly(enamine ketone) having a molecular weight from about 300–15,000 or higher. Also the amine-terminated polyalkylene ether sequence can be prepared from linear or branched aliphatic polyoxyalkylene polyols or glycols having a molecular weight from about 200–15,000 and preferably 1000 to 6000 The stociometry of the reaction is designed to yield a polymer of sufficient repeat units so that said poly(enamine ketone co-alkylene ether) block copolymer has an intrinsic viscosity of from about 0.2 or 0.4 to about 2.5 and usually 0.6 to 2.0.

Bispropynones useful and preferred in this invention are those that yield poly(enamine ketones) with high Tg and high Tm. The preferred Tg range for the poly(enamine ketone) hardblock is between 23° and 150° C. and Tm between 150° and 250° C. Particularly preferred are those bispropynones such as adipoyl diethynyl diketone formula (VII) below:

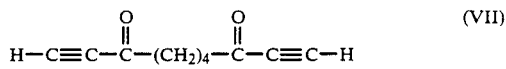

or phenyl diethynyl diketone (sometimes referred to as PDEDK) formula (VIII) below:

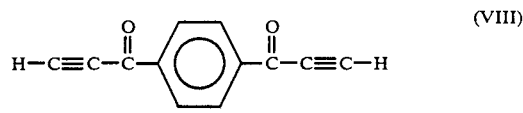

Bispropynone (VII) reacts with 1,6-hexanediamine to produce a polymer with a TM of 188° C. If, instead of the aliphatic diamines such as 1,6-hexanediamine, a xylene diamine is used, the nature of the block obtained changes as well as resistance to fuel swelling and oil solubility.

For those thermoplastic elastomers of the present invention where a second diamine is used along with the amine terminated polyalkene ether, preferred diamines are those in which the amino terminus is a secondary amine.

The exclusion of an NH group in the copolymer of the present invention greatly enhances the thermal stability or the temperature differences between Tn and the temperature at which a 5% weight loss is experienced in a Thermal Gravometric Analysis (TGA) spectra.

Particularly preferred diamines are selected from the illustrative and representative secondary groups consisting of N,N'-dimethyl-1,4-butane diamine, N,N'-dimethyl-1,6-hexane diamine, N,N'-dimethyl-1,5-pentane diamine, N,N'-dimethyl-1,7-heptane diamine, N,N'-dimethyl-1,8-octane diamine, Unilink (R) 4200 from UOP Chemical Co., or Palacure(R) 740 from Polaroid Chemical Co.

Polymers of the present invention are prepared under suitable conditions to maintain the reacting mixture in a fluid state at temperatures between 0° and 200° C. and preferably under ambient pressure with a preferable temperature range between 50° and 150° C. Thus, those having these characteristics are more easily modified for RIM shaping.

These three manufacturing methods can be performed in the absence or presence of solvents such as m-cresol.

The reaction period should be sufficient to achieve substantially complete reaction of all of the bispropynone in order to generate poly(enamine ketone-co-alkylene ether) block copolymers having intrinsic viscosity between 0.4 and 2.0 which is desirable for attaining products with satisfactory properties for forming molded and/or extruded thermoplastic elastomer materials or as blending agents.

Reaction periods will vary depending on the exact starting materials used in the above mentioned formation methods, but generally the reaction can be completed between 10 minutes and 12 hours, preferable period are between 1 and 7 hours.

The reaction stoichiometry for the third formation method is preferably a near one to one mixture of the preformed poly(enamine ketones) and amine terminated polyalkylene ether. However, slight excesses (from about 1 to 10%) of one or the other component is also acceptable. With respect to formation method 1, the two components must be in sufficient amounts to afford a polymer with an intrinsic viscosity in the desired range between about 0.4 and about 2.0.

The thermoplastic elastomers of the present invention are soluble in a variety of chlorinated hydrocarbons such as chloroform.

The invention will be further described by reference to the following examples which are given by way of illustration but not of limitation.

Generally, the polyalkylene ether block is considered to be the soft block whereas hard block is considered to arise from the bispropynone group. Thus, it is possible to effect the soft group by varying the nature of the polyoxyalkylene group. Hence, where the polyoxyalkylene group is polyoxytetramethylene the tensile properties are very good. Whereas, the polyoxypropylene radical yields products of less strength. On the other hand, the polyoxyethylene radical may introduce a tendency to be hydrophillic whereas those oxyalkylene radicals of 4 or more carbons are hydrophobic.

EXAMPLE 1

This example illustrates the preparation of a poly(enamine ketone-co-alkylene ether) from ADEDK (adipoyl diethynyldiketone or 1,1'-(1,4-butylene)-bis(2-propyn-1one)) and Polamine 1000 (Registred Trademark from the Polariod Chemical Company).

0.5 grams (0.003082 moles) of ADEDK was reacted with 3.9326 grams (0.003082 moles) of Polamine 1000 (the bis. para-amino benzoate of PTMEG 1000, a polytetramethylene ether glycol of about 1000 molecular weight in 10% m-cresol in a glass bottle equipped with a magnetic stirrer at 125° F. overnight. The solution turned dark brown and slightly viscous. The polymer was recovered by precipitation into a mixture of petroleum ether and diethylether and immediately recrystallized from chloroform. Precipitate was compression molded and/or cast into a film from chloroform.

The polymer had the following properties: $[n]=0.47$ g/dl in m-cresol at 30.1° C.; Tm=112° C.; Tg=-38° C; T-5%=363° C. (temperature at which a 5% weight loss is observed in a Thermal Gravometric Analysis (TGA) analysis); tensile strength=11.8 mPa; Modulus=18 mPa; elongation at break=947%; Fuel swell=65%; and oil swell=73%.

EXAMPLE 2

This example illustrates the preparation of a poly(enamine ketone-co-alkylene ether) from PDEDK (phenyl diethynyldiketone or 1,4-bis(2-propyn-1-one)-benzene) and Polamine 1000 (Registered Trademark from the Polaroid Chemical Company).

0.5 grams (0.002730 moles) of PDEDK was reacted with 3.4834 grams (0.002730 moles) of Polamine 1000 (the bis para-amino benzoate of PTMEG 1000) in 10% m-cresol in a glass bottle equipped with a magnetic stirrer at 125° F. overnight. The solution turned dark brown and slightly viscous. The polymer was recovered by precipitation into a mixture of petroleum ether and diethylether and immediately recrystallized from chloroform. Precipitate was compression molded and/or cast into a film from chloroform.

The polymer had the following properties: $[n]=1.42$ g/dl in m-cresol at 30.1° C.; Tm=180° C.; Tg=-49° C.; T-5%=353° C.; 22.0 mpa; 16.4 mpa; 1000+%; 80%; 83%.

EXAMPLE 3

This example illustrates the preparation of a poly(enamine ketone-co-alkylene ether) from PDEDK (phenyl diethynyldiketone or 1,4-bis(2-propyn-1-one)-benzene), DHDA (N'N'-dimethyl-1,6-hexanediamine) and Polamine 1000 (Registered Trademark from the Polaroid Chemical Company).

0.5 grams (0.002730 moles) of PDEDK was reacted with 0.3139 grams (0.00218 moles) of DHDA and 0.7018 grams (0.00055 moles) of Polamine 1000 (the bis para-amino benzoate of PTMEG 1000) in 10% m-cresol in a glass bottle equipped with a magnetic stirrer at 125° F. overnight. The solution turned dark brown and slightly viscous. The polymer was recovered by precipitation into a mixture of petroleum ether and diethylether and immediately recrystallized from chloroform. Precipitate was compression molded and/or cast into a film from chloroform.

The polymer had the following properties: [n]0.58; 212; −37; 212; 20.2; 37.6; 647%; 60%; 88%

EXAMPLE 4

This example illustrates the preparation of a poly(enamine ketone-co-alkylene ether) from PDEDK (phenyl diethynyldiketone or 1,4-bis(2-propyn-1-one)-benzene), Unilink 4200 (Registred Trademark from UOP Chemical Company) and Polamine 1000 (Registred Trademark from the Polariod Chemical Company).

0.5 grams (0.002730 moles) of PDEDK was reacted with 0.6768 grams (0.00218 moles) of Unilink 4200 and 0.7018 grams (0.00055 moles) of Polamine 1000 (the bis para-amino benzoate of PTMEG 1000) in 10% m-cresol in a glass bottle equipped with a magnetic stirrer at 125° F. overnight. The solution turned dark brown and slightly viscous. The polymer was recovered by precipitation into a mixture of petroleum ether and diethylether and immediately recrystallized from chloroform. Precipitate was compression molded and/or cast into a film from chloroform.

The polymer had the following properties: 0.47; none; 22; 360; 18.9; 5.6; 874%; 60%; 82%.

EXAMPLE 5

This example illustrates the preparation of a poly(enamine ketone-co-alkylene ether) from PDEDK (phenyl diethynyldiketone or 1,4-bis(2-propyn-1-one)-benzene), Polacure 740 (Registred Trademark from the Polariod Chemical Company) and Polamine 1000 (Registred Trademark from the Polariod Chemical Company).

0.5 grams (0.002730 moles) of PDEDK was reacted with 0.6768 grams (0.00218 moles) of Polacure 740 (the bis paraamino benzoate of 1,3-propanediol) and 0.7018 grams (0.00055 moles) of Polamine 1000 (the bis paraamino benzoate of PTMEG 1000) in 10% m-cresol in a glass bottle equipped with a magnetic stirrer at 125° F overnight. The solution turned dark brown and slightly viscous. The polymer was recovered by precipitation into a mixture of petroleum ether and diethylether and immediately recrystallized from chloroform. Precipitate was compression molded and/or cast into a film from chloroform.

The polymer had the following properties: 1.07; 178; −38; 387; 18.2; 55.9; 954%; 79%; 82%.

What is claimed is:

1. A block copolymer of the formula (I)

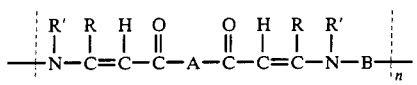

wherein R' is H, alkyl, aryl or cycloalkyl; A is an arylene, alkylene, or cycloalkylene group a poly(enamine ketone) sequence formed from an aliphatic or aromatic $C_6$–$C_{20}$ bispropynone and a linear or branched, aliphatic $C_6$–$C_{18}$ diamine, in the presence of a chain-limiting aromatic or aliphatic bispropynone having 6 to 20 carbon atoms, said poly(enamine ketone) having an average molecular weight between 300 and 15,000 or higher; and wherein B is an amine-terminated polyalkylene ether formed from linear or branched aliphatic polyoxyalkylene glycols having a molecular weight of between 200–6000 and n indicates a sufficient number of repeating units so that said poly(enamine ketone-co-alkylene ether) block copolymer has an intrinsic viscosity of from about 0.4 to about 2.5, B is a combination of an amine-terminated polyalkylene ether of 200 to 15,000 molecular weight and an aliphatic or aromatic diamine and n indicates a sufficient number of repeating units so that said poly(enamine ketoneco-alkylene ether) block copolymer has an intrinsic viscosity of from about 0.6 to about 2.0.

2. A block copolymer according to claim 1, wherein the amine terminated polyalkylene ether is a polymer of a linear or branched aliphatic polyoxyalkylene glycol having an amine terminus at each polymer end group.

3. A block copolymer according to claim 2 wherein the amine terminated polyalkylene ether has a molecular weight between 200–6000.

4. A block copolymer according to claim 3 wherein the amine terminated polyalkylene ether has molecular weight between 1000–4000.

5. The block copolymer of claim 1 wherein the polyalkylene radical of B is an alkylene radical containing more than 3 carbon atoms.

6. A block copolymer according to claim 1 wherein the proportion of weight of the amine terminated polyalkylene ether is from about 20–80%.

7. A block copolymer according to claim 6 wherein the proportion of weight of the amine terminated polyalkylene ether is from about 40–60%.

8. A block copolymer according to claim 7 wherein the alkylene and oxygen ratio in the block copolymer is at least 2.5.

9. A block copolymer according to claim 1 wherein said diamine is an aliphatic diamine or aromatic diamine.

10. A block copolymer according to claim 1 wherein said diamine is an aromatic diamine selected from the group consisting of: dianiline, methane dianiline or a diamine terminated polyoxyalkylene of about 200 to 1000 molecular weight.

11. A block copolymer according to claim 1 wherein A is an arylene group having between 6 and 20 carbon atoms.

12. The block copolymer of claim 1 having an intrinsic viscosity of 0.6 to 2.0.

13. A block copolymer according to claim 1 where the $C_6$–$C_{20}$ aliphatic bispropynone is selected from the group consisting of the diketones of diethynyl, dipropynyl, dibutynyl, dipentynyl, or diamynyl.

14. A block copolymer according to claim 1 where the $C_6$–$C_{20}$ aromatic bispropynone is selected from the group consisting of A's being divalent radicals of benzene, toluene, xylene, naphthalene and biphenyl.

15. A block copolymer according to claim 1 where the $C_6$–$C_{18}$ aliphatic diamine is selected from the group consisting of N,N'-dimethyl-1,4-butane diamine, N,N'-dimethyl-1,5-pentane diamine, N,N'-dimethyl-1,6-hexane diamine, N,N'-dimethyl-1,7-heptane diamine, or N,N'-dimethyl-1,8-octane diamine.

16. A block copolymer according to claim 2 wherein the polyoxyalkylene glycol is selected from the group consisting of polyoxyethylene glycol, polyoxypropylene glycol, polyoxytetramethylene glycol, mixtures thereof and a copolymer derived therefrom.

17. A process for preparing the block copolymer according to claim 1, which comprises the steps of reacting bispropynone as defined in claim 1, the propynone groups which are located at the chain ends, with an amine terminated polyalkylene ether as defined in claim 1, laminated at the chain ends at sufficiently high temperature so that the reactants are in the fused state.

* * * * *